(12) United States Patent
Tang et al.

(10) Patent No.: US 10,931,186 B2
(45) Date of Patent: Feb. 23, 2021

(54) LINEAR VIBRATION MOTOR

(71) Applicant: AAC ACOUSTIC TECHNOLOGIES (SHENZHEN) CO., LTD., Shenzhen (CN)

(72) Inventors: Yun Tang, Shenzhen (CN); Lubin Mao, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 48 days.

(21) Appl. No.: 16/527,006

(22) Filed: Jul. 30, 2019

(65) Prior Publication Data

US 2020/0044539 A1 Feb. 6, 2020

(30) Foreign Application Priority Data

Aug. 3, 2018 (CN) .......................... 201821252487.2

(51) Int. Cl.
*H02K 33/14* (2006.01)
*H02K 33/16* (2006.01)

(52) U.S. Cl.
CPC ............. *H02K 33/14* (2013.01); *H02K 33/16* (2013.01)

(58) Field of Classification Search
CPC ................................ H02K 33/14; H02K 33/16
USPC ........................................................ 310/33
See application file for complete search history.

(56) References Cited

U.S. PATENT DOCUMENTS

| | | | | |
|---|---|---|---|---|
| 6,747,631 | B1 * | 6/2004 | Sakamaki | G01L 1/14 345/157 |
| 8,269,379 | B2 * | 9/2012 | Dong | H02K 33/16 310/25 |
| 2011/0001365 | A1 * | 1/2011 | Park | H02K 33/16 310/17 |
| 2011/0062804 | A1 * | 3/2011 | Lee | H02K 33/18 310/30 |
| 2011/0204732 | A1 * | 8/2011 | Miyamoto | H02K 33/16 310/25 |
| 2013/0193779 | A1 * | 8/2013 | Kuroda | H02K 33/16 310/15 |
| 2014/0084710 | A1 * | 3/2014 | Endo | B06B 1/045 310/25 |
| 2015/0207392 | A1 * | 7/2015 | Iwakura | H04R 11/02 310/25 |
| 2016/0013710 | A1 * | 1/2016 | Dong | H02K 33/16 310/25 |
| 2016/0226363 | A1 * | 8/2016 | Mao | H02K 33/16 |
| 2017/0012516 | A1 * | 1/2017 | Xu | H02K 11/30 |

(Continued)

FOREIGN PATENT DOCUMENTS

EP 3410586 A1 * 12/2018 ............. H02K 33/18

*Primary Examiner* — Alex W Mok

(74) *Attorney, Agent, or Firm* — W&G Law Group LLP

(57) ABSTRACT

Disclosed is a linear vibration motor, including a base, a cover plate, a vibration unit, and a drive unit. The vibration unit includes a counterweight block and a magnetic steel. An accommodating groove is provided in the counterweight block. At least two pieces of magnetic steel are respectively located on two opposite sides of the accommodating groove. The drive unit includes an iron core accommodated in the accommodating groove and fixed on the base and two first coils and two second coils that are respectively fixedly sleeved over the iron core. The two second coils and two pieces of magnetic steel are together circumferentially disposed in the accommodating groove and are arranged alternately.

6 Claims, 4 Drawing Sheets

(56) References Cited

U.S. PATENT DOCUMENTS

| | | | |
|---|---|---|---|
| 2017/0033663 A1* | 2/2017 | Wang | H02K 33/12 |
| 2017/0033673 A1* | 2/2017 | Wang | H02K 33/16 |
| 2017/0144191 A1* | 5/2017 | Mao | B06B 1/045 |
| 2018/0026514 A1* | 1/2018 | Mao | H02K 5/04 |
| | | | 310/12.16 |
| 2018/0342937 A1* | 11/2018 | Mao | H02K 33/02 |
| 2019/0157958 A1* | 5/2019 | Mao | H02K 33/12 |

* cited by examiner

LINEAR VIBRATION MOTOR

TECHNICAL FIELD

The present disclosure relates to a motor, and in particular, to a linear vibration motor applied to mobile electronic products.

BACKGROUND

With the development of electronics technologies, portable consumer electronic products such as mobile phones, handheld game consoles, navigation apparatuses or handheld multimedia entertainment devices become increasingly popular among people. Linear vibration motors are usually used in these electronic products to provide system feedbacks such as call alerts, message alerts, and navigation alerts of mobile phones and vibration feedbacks of game consoles. Such wide application requires that vibration motors have high performance and long service life.

A linear vibration motor in related technologies includes a base having an accommodating space, a vibration unit located in the accommodating space, an elastic part fixing and suspending the vibration unit in the accommodating space, and a drive unit fixed on the base. A magnetic field generated by a coil of the drive unit and a magnetic field generated by the vibration unit interact to drive the vibration unit to make a reciprocal linear movement to generate vibration.

However, in the linear vibration motor in related technologies, the drive unit is only one coil fixedly disposed on the base or two coils fixedly disposed in parallel on the base. A driving force generated by the drive unit is limited, and the vibration performance of the linear vibration motor is restricted.

Therefore, it is necessary to provide a new linear vibration motor to resolve the foregoing problem.

DETAILED DESCRIPTION

The present disclosure is further described below with reference to the accompanying drawings and embodiments.

Figure 1:
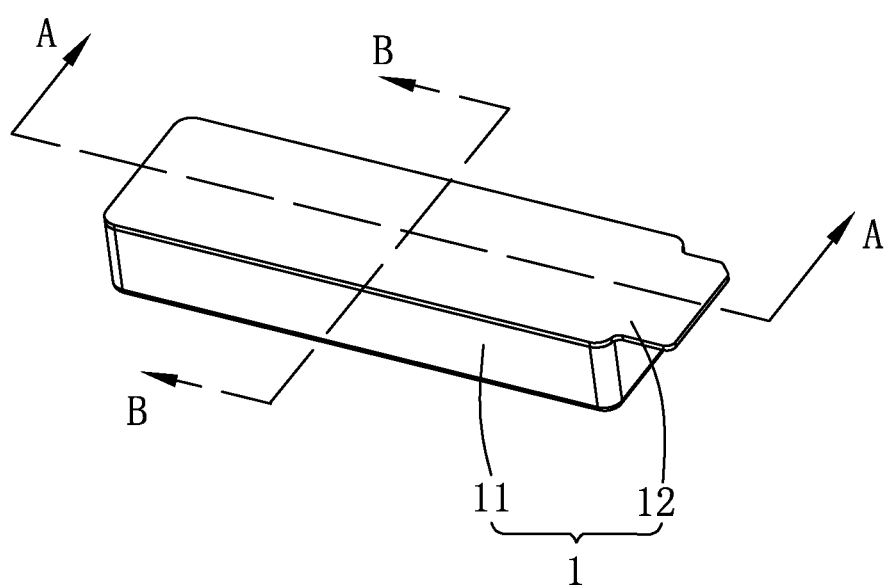
FIG. 1 is a structural perspective view of a linear vibration motor according to the present disclosure.
Figure 2:
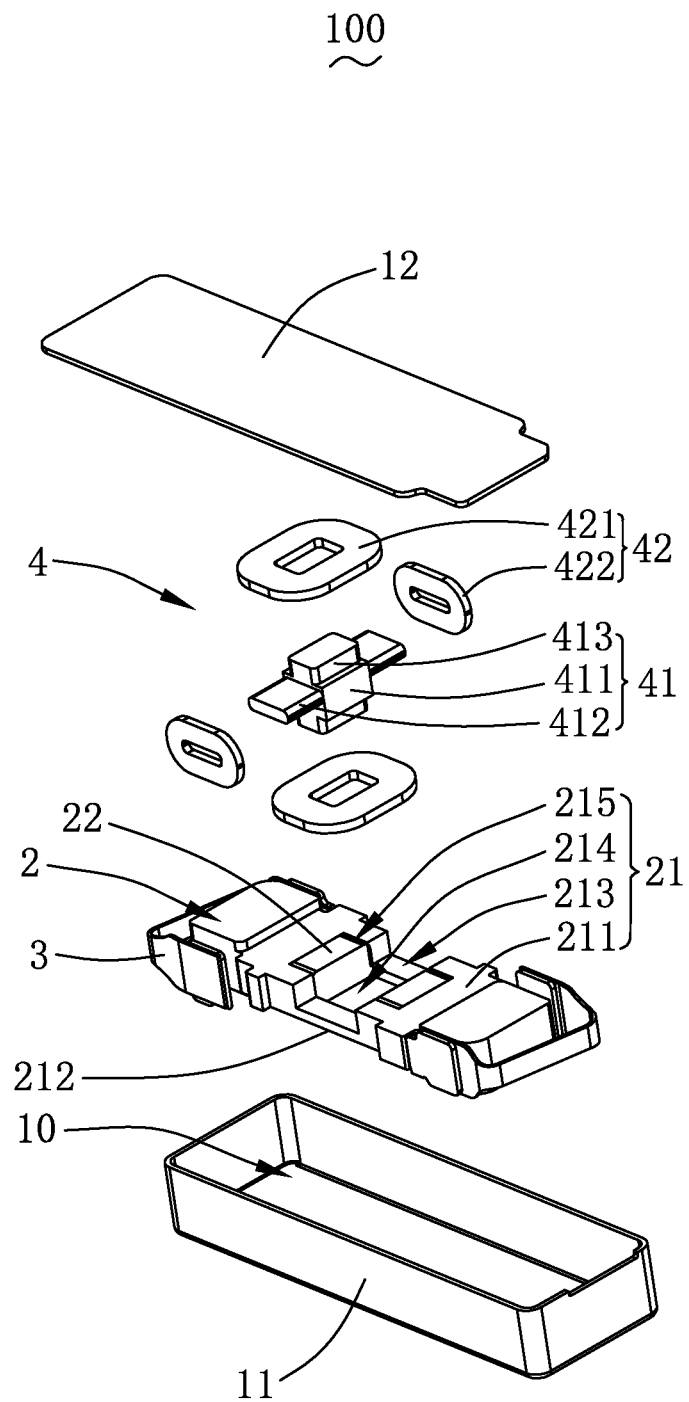
FIG. 2 is a structural perspective exploded view of a linear vibration motor according to the present disclosure.

FIG. 1 is a structural perspective view of a linear vibration motor according to the present disclosure. FIG. 2 is a structural perspective exploded view of a linear vibration motor according to the present disclosure. The present disclosure provides a linear vibration motor 100, including a housing 1 having an accommodating space 10, a vibration unit 2, an elastic part 3, and a drive unit 4.

The housing 1 includes a base 11 and a cover plate 12 fixedly covering on the base 11. The base 11 and cover plate 12 enclose the accommodating space 10 together. Certainly, the base 11 and the cover plate 12 may have an integral structure. In this embodiment, for example, the linear vibration motor 100 has a rectangular structure.

The vibration unit 2 is suspended in the accommodating space 10 by using the elastic part 3.

Specifically, the vibration unit 2 includes a counterweight block 21 and a magnetic steel 22 fixed in the counterweight block 21.

The counterweight block 21 includes a top surface 211 close to the cover plate 12, a bottom surface 212 disposed opposite the top surface 211, an accommodating groove 213 concave from the top surface 211 in a direction towards the bottom surface 212, an accommodating hole 214 provided penetrating the accommodating groove 213, and two clamping grooves 215 concave from the top surface 211 in a direction towards the bottom surface 212 and respectively located on two opposite sides of the accommodating groove 213.

The counterweight block 21 is in one aspect configured to fix the magnetic steel 22 and in another aspect configured to increase the weight of the vibration unit 2, so as to increase an amplitude value of the vibration of the vibration unit 2, thereby improving a vibration effect of the linear vibration motor 100.

At least two pieces of magnetic steel 22 are respectively located on the two opposite sides of the accommodating groove 213. In this embodiment, the two pieces of magnetic steel 22 are respectively disposed on the two opposite sides of the accommodating groove 213 in a long axis direction of the linear vibration motor 100. Preferably, the two pieces of magnetic steel 22 are respectively fixedly clamped in the two clamping grooves 215.

Preferably, the vibration unit 2 is symmetrical about the accommodating groove 213, so that the vibration unit 2 has a symmetrical structure and uniform mass distribution. Therefore, the vibration unit 2 is more stable during vibration, thereby avoiding twists.

The elastic part 3 is configured to suspend the vibration unit 2 in the accommodating space 10. In this embodiment, one end of the elastic part 3 is fixed in the counterweight block 21, and the other end is fixed on the base 11 of the housing 1, so as to provide a support and a vibration restoring force to the vibration unit.

Figure 3:
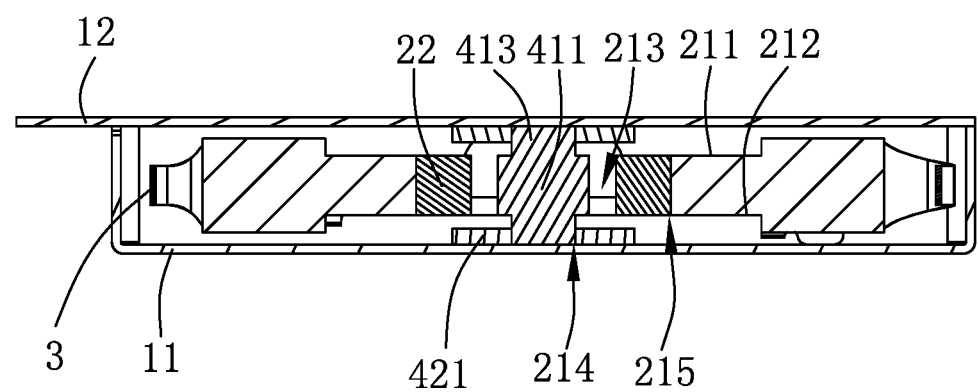
FIG. 3 is a sectional view along a line A-A in FIG. 1.
Figure 4:
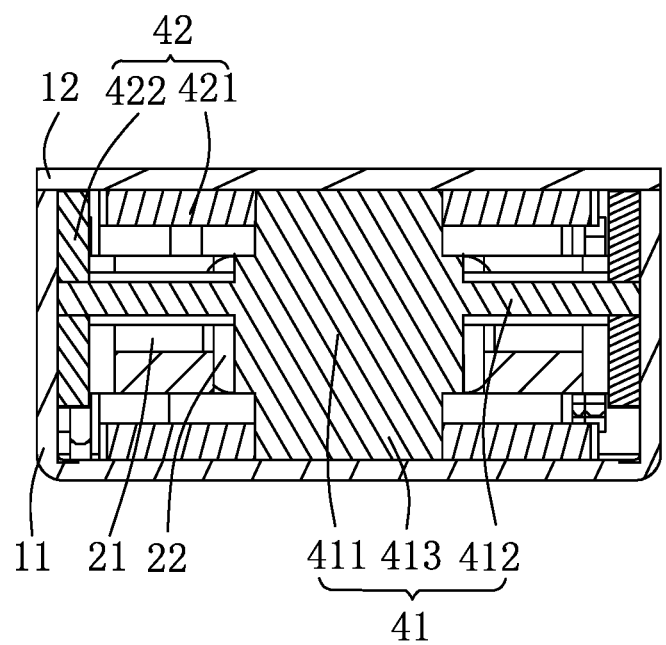
FIG. 4 is a sectional view along a line B-B in FIG. 1.

FIG. 3 is a sectional view along a line A-A in FIG. 1. FIG. 4 is a sectional view along a line B-B in FIG. 1. The drive unit 4 is fixed on the base 11 and is disposed spaced from the vibration unit 2, and is configured to drive the vibration unit 2 to vibrate. The drive unit 4 includes an iron core 41 accommodated in the accommodating groove 213 and fixed on the base 11 via the accommodating hole 214 and a coil 42 fixed on the iron core 41.

Specifically, the iron core 41 includes a body portion 411, two first extending walls 412 respectively extending from two opposite sides of the body portion 411 in a vibration direction, and two second extending walls 413 respectively extending from the two opposite sides of the body portion 411 that are perpendicular to the vibration direction.

Preferably, the two first extending walls 412 respectively fixedly abut two opposite sides of the base 11 in a direction parallel to the vibration direction. The two second extending walls 413 respectively abut and are fixed on the base 11 and the cover plate 12 in a direction perpendicular to the vibration direction, that is, a direction perpendicular to the cover plate 12.

The coil 42 includes two first coils 421 and two second coils 422 that are respectively fixedly sleeved over the iron core 41.

The two first coils 421 are respectively disposed parallel to the cover plate 12, and are respectively fixedly sleeved over two opposite sides of the iron core 41 that are parallel to the cover plate 12. In this embodiment, the two first coils 421 are respectively fixedly sleeved over the two second extending walls 413.

Preferably, the two first coils 421 are respectively attached to and fixed on the base 11 and the cover plate 12.

The two second coils 422 are respectively disposed perpendicular to the cover plate 12, and are respectively fixedly sleeved over two opposite sides (that is, two opposite sides of the iron core 41 in the vibration direction) of the iron core 41 in a short axis direction of the linear vibration motor 100. The two second coils 422 and the two pieces of magnetic steel 22 are together circumferentially disposed in the accommodating groove 213 and are arranged alternately. In this embodiment, the two second coils 422 are respectively fixedly sleeved over the two first extending walls 412.

Preferably, the two second coils 422 are respectively fixedly attached to two opposite sides of the base 11, specifically, two long axis sides of the base 11.

In the foregoing structure, the drive unit 4 and the vibration unit 2 are separated from each other. The drive unit 4 is fixed on the housing 1, and the vibration unit 2 is suspended in the accommodating space by using the elastic part 3 and is driven by the drive unit 4 to vibrate.

It should be noted that the vibration direction in this embodiment is the vibration direction of the vibration unit 2.

In the foregoing structure, the two first coils 421 and the two second coils 422 form a four-coil structure. Current directions of the two first coils 421 and the two second coils 422 are respectively controlled to enable the linear vibration motor 100 to form a double resonance vibration structure, and the four-coil structure effectively increases a Lorentz force, that is, effectively increases a driving force of the drive unit 4.

Compared with related technologies, in the linear vibration motor of the present disclosure, the counterweight block is provided with the accommodating groove and the accommodating hole that penetrates the accommodating groove. The magnetic steel is fixed in the counterweight block and is located on the two opposite sides of the accommodating groove. The iron core of the drive unit is accommodated in the accommodating groove. The two first coils are disposed on the two opposite sides of the iron core in the direction perpendicular to the vibration direction, and the two second coils are disposed on the two opposite sides of the iron core in the vibration direction, so as to form a four-coil structure. By controlling current directions in each coil, a double resonance structure is implemented, so as to effectively increase a Lorentz force, thereby significantly improving the vibration performance of the linear vibration motor.

The foregoing descriptions are merely preferred embodiments of the present disclosure but are not intended to limit the patent scope of the present disclosure. Any equivalent modifications made to the structures or processes based on the content of the specification and the accompanying drawings of the present disclosure for direct or indirect use in other relevant technical fields shall also fall within in the patent protection scope of the present disclosure.

What is claimed is:

1. A linear vibration motor, comprising:
   a base,
   a cover plate covering the base and enclosing an accommodating space together with the base,
   a vibration unit accommodated in the accommodating space,
   an elastic part suspending the vibration unit in the accommodating space, and
   a drive unit fixed on the base and configured to drive the vibration unit to vibrate;
   wherein the vibration unit comprises a counterweight block and a magnetic steel fixed in the counterweight block;
   wherein the counterweight block comprises a top surface close to the cover plate, a bottom surface disposed opposite the top surface, an accommodating groove concave from the top surface in a direction towards the bottom surface, and an accommodating hole penetrating the accommodating groove; at least two pieces of magnetic steel are respectively located on two opposite sides of the accommodating groove;
   wherein the drive unit is disposed spaced from the vibration unit, and comprises:
   an iron core accommodated in the accommodating groove and fixed on the base via the accommodating hole, and
   a coil fixed on the iron core;
   wherein the coil comprises two first coils and two second coils that are respectively fixedly sleeved over the iron core, the two first coils are respectively disposed parallel to the cover plate and are respectively fixedly sleeved over two opposite sides of the iron core that are parallel to the cover plate; the two second coils are respectively disposed perpendicular to the cover plate, and are respectively fixedly sleeved over two opposite sides of the iron core in a short axis direction of the linear vibration motor; and the two second coils and two pieces of magnetic steel are together circumferentially disposed in the accommodating groove and are arranged alternately.

2. The linear vibration motor according to claim 1, wherein the counterweight block further comprises two clamping grooves concave from the top surface in a direction towards the bottom surface and respectively located on the two opposite sides of the accommodating groove, and the two pieces of magnetic steel are respectively fixedly clamped in the two clamping grooves.

3. The linear vibration motor according to claim 1, wherein the iron core comprises a body portion and two first extending walls respectively extending from two opposite sides of the body portion in a vibration direction, and the two second coils are respectively fixedly sleeved over the two first extending walls.

4. The linear vibration motor according to claim 3, wherein the iron core further comprises two second extending walls respectively extending from two opposite sides of the body portion that are perpendicular to the vibration direction, the two second extending walls respectively abut and are fixed on the base and the cover plate, and the two first coils are respectively fixedly sleeved over the two second extending walls.

5. The linear vibration motor according to claim 4, wherein the two first coils are respectively attached to and fixed on the base and the cover plate.

6. The linear vibration motor according to claim 3, wherein the two first extending walls respectively fixedly abut two opposite sides of the base, and the two second coils are respectively fixedly attached to the base.

* * * * *